United States Patent
Takahashi et al.

(10) Patent No.: US 12,204,802 B2
(45) Date of Patent: Jan. 21, 2025

(54) PRINTING DEVICE AND PRINTING SYSTEM

(71) Applicant: SCREEN HOLDINGS CO., LTD., Kyoto (JP)

(72) Inventors: Susumu Takahashi, Kyoto (JP); Tetsuya Ishida, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/477,048

(22) Filed: Sep. 28, 2023

(65) Prior Publication Data

US 2024/0028273 A1 Jan. 25, 2024

Related U.S. Application Data

(62) Division of application No. 17/587,317, filed on Jan. 28, 2022, now Pat. No. 11,809,760.

(30) Foreign Application Priority Data

Mar. 24, 2021 (JP) ................. 2021-050841

(51) Int. Cl.
*G06K 15/00* (2006.01)
*B41J 13/00* (2006.01)
(Continued)

(52) U.S. Cl.
CPC .......... *G06F 3/121* (2013.01); *B41J 13/0045* (2013.01); *G06F 3/1208* (2013.01);
(Continued)

(58) Field of Classification Search
CPC ...... G06F 3/121; G06F 3/1208; G06F 3/1234; G06F 3/1282; B41J 13/0045; G06K 15/102; G06K 15/16
See application file for complete search history.

(56) References Cited

U.S. PATENT DOCUMENTS

| 6,106,094 A | 8/2000 | Otani et al. |
| 2012/0242735 A1 | 9/2012 | Izawa et al. |

(Continued)

FOREIGN PATENT DOCUMENTS

| JP | H09-277670 A | 10/1997 |
| JP | 11-179987 A | 7/1999 |

(Continued)

OTHER PUBLICATIONS

U.S. PTO Non-Final Office Action issued in related parent U.S. Appl. No. 17/587,317, dated Apr. 6, 2023.

(Continued)

*Primary Examiner* — Moustapha Diaby
(74) *Attorney, Agent, or Firm* — Rimon P.C.

(57) ABSTRACT

When a printing interruption cause occurs during printing of an image on a printing medium, printing of a page being printed is completed, and further only a position mark is printed on a printing resumption page. Then, a printing unit is stopped, and a conveyance speed is decelerated to stop conveyance of the printing medium. Next, the printing medium is rewound so that printing is resumed from the printing resumption page. Thereafter, the conveyance speed is accelerated to a predetermined speed, and printing is resumed from the printing resumption page on which the position mark is printed.

6 Claims, 9 Drawing Sheets

(51) Int. Cl.
*G06F 3/12* (2006.01)
*G06K 15/02* (2006.01)
*G06K 15/10* (2006.01)
*G06K 15/16* (2006.01)

(52) U.S. Cl.
CPC .......... *G06F 3/1234* (2013.01); *G06F 3/1282* (2013.01); *G06K 15/102* (2013.01); *G06K 15/16* (2013.01)

(56) References Cited

U.S. PATENT DOCUMENTS

| | | |
|---|---|---|
| 2013/0155131 A1 | 6/2013 | Izawa et al. |
| 2014/0055515 A1* | 2/2014 | Buschmann ............ B41J 11/42 347/14 |
| 2014/0064747 A1* | 3/2014 | Numazu ............ G03G 15/5062 399/19 |
| 2015/0170011 A1* | 6/2015 | Hattori ................ G06F 3/1234 358/1.6 |
| 2018/0037037 A1 | 2/2018 | Takagi et al. |
| 2018/0170077 A1 | 6/2018 | Nistor |

FOREIGN PATENT DOCUMENTS

| | | |
|---|---|---|
| JP | 2006-256166 A | 9/2006 |
| JP | 2012-200976 A | 10/2012 |
| JP | 2013-123832 A | 6/2013 |
| JP | 2013-151126 A | 8/2013 |
| JP | 2014-144608 A | 8/2014 |
| JP | 2014-195925 A | 10/2014 |
| JP | 2015-107615 A | 6/2015 |
| JP | 2016-144895 A | 8/2016 |
| JP | 2018-130898 A | 8/2018 |
| WO | 2017/169527 A1 | 10/2017 |

OTHER PUBLICATIONS

U.S. PTO Notice of Allowance issued in related parent U.S. Appl. No. 17/587,317, dated Jul. 24, 2023.

* cited by examiner

FIRST STAGE (PRINTING INTERRUPTION CAUSE OCCURS)

SECOND STAGE (PRINT IMAGE OF PRINTING-INTERRUPTION-TIME LAST PAGE AND POSITION MARK OF PRINTING RESUMPTION PAGE)

THIRD STAGE (REWIND PRINTING MEDIUM)

FOURTH STAGE (RESUME PRINTING)

PRINTING DEVICE AND PRINTING SYSTEM

CROSS REFERENCES TO RELATED APPLICATIONS

This is a Divisional of U.S. patent application Ser. No. 17/587,317 filed on Jan. 28, 2022, which claims priority based on Japanese Patent Application No. 2021-050841 filed on Mar. 24, 2021, and the contents of which are herein incorporated by reference.

BACKGROUND OF THE INVENTION

Field of the Invention

The present invention relates to a printing device configured to perform printing on a printing medium and a printing system configured to perform printing by connecting two printing devices via a reversing unit, and particularly relates to a printing device and a printing system having a pause function of interrupting printing during printing and then resuming the printing.

Description of Related Art

If a printing interruption cause (a matter that should interrupt printing) occurs while printing is performed on a printing medium by using a printing device, the printing is interrupted, and the printing is resumed after the printing interruption cause is eliminated. However, there may be a blank portion between a page printed last before the printing is interrupted and a page printed first after the printing is resumed. For example, Japanese Laid-Open Patent Publication No. 2014-144608 discloses that, in order to overcome a problem that a printing position on the front surface and a printing position on the back surface deviate from each other because the printing medium expands and contracts when back surface printing is performed after printing on a front surface of a printing medium is performed and then the printing medium is dried, printing is performed in consideration of expansion and contraction of the printing medium in a width direction occurring during drying after the front surface printing. In addition, Japanese Laid-Open Patent Publication No. 2016-144895 describes that in a case where a thick portion is formed on a long belt-shaped printing medium at a predetermined cycle, printing is stopped before the thick portion reaches a printing region, and a relative position between a printing head and a recording region is switched to a retraction position, and the relative position between the printing head and the recording region is switched to the printing position after the thick portion passes through the printing region, by which a periodic shift of the printing position before and after the interruption of a printing process can be suppressed.

However, the printing method described in Japanese Laid-Open Patent Publication No. 2014-144608 is a method of correcting a positional shift between an image printed on the front surface of the printing medium and an image printed on the back surface of the printing medium. Therefore, in a case where after the printing resumption, the printing is performed on the same surface as the surface on which the printing has been performed before the interruption, a blank portion appears between the page printed before the interruption and the page printed after the interruption. In addition, the printing method described in Japanese Laid-Open Patent Publication No. 2016-144895 can be applied to the case where the printing medium has a thick portion periodically. However, even if the printing method is applied in a case where continuous paper without a thick portion is used and printing is resumed after printing interruption, it is not possible to prevent the blank portion from appearing between the page printed before interruption and the page printed after interruption.

SUMMARY OF THE INVENTION

In view of the above circumstances, an object of the present invention is to provide a printing device and a printing system capable of resuming printing so that a blank portion does not appear between a page printed before interruption and a page printed after interruption when printing is interrupted due to occurrence of a printing interruption cause.

One aspect of the present invention is directed to a printing device configured to print an image over a plurality of pages on a first surface of a printing medium having a long belt shape, the printing device including:
  a conveyance unit configured to convey the printing medium;
  a printing unit configured to print an image by ejecting ink on the first surface of the printing medium conveyed by the conveyance unit; and
  a control unit,
  wherein the control unit includes:
    a printing control unit configured to control operation of the printing unit; and
    a conveyance control unit configured to control operation of the conveyance unit,
  the printing control unit includes a printing interruption control unit configured to control, when a printing interruption cause occurs, the printing unit to interrupt printing operation after completing printing of a printing-interruption-time last page being printed on the first surface of the printing medium, and further printing a position mark indicating a printing resumption position on a printing resumption page that is a next page of the printing-interruption-time last page, and
  the conveyance control unit includes a conveyance speed control unit configured to control, after interruption of printing operation, the conveyance unit to start deceleration of a conveyance speed of the printing medium and stop a conveyance of the printing medium.

According to the above-described configuration, when a printing interruption cause (a matter that should interrupt printing) occurs while an image is being printed on the printing medium, the printing unit completes printing of all the pages being printed, and further, stops printing operation after printing only the position mark indicating the page to be printed first when the printing is resumed. Thereafter, the conveyance control unit controls the conveyance unit to decelerate and stop the printing medium. Therefore, the printing is resumed from the page with the position mark printed, and no blank portion appear between the page printed last before printing interruption and the page printed first after printing resumption. As a result, the occurrence of damaged paper is prevented.

Another aspect of the present invention is directed to a printing system including: a first printing device configured to print a first image on a first surface of a printing medium including the first surface and a second surface that is a back surface of the first surface; a second printing device configured to print a second image on the second surface; and a reversing unit provided between the first printing device and the second printing device and configured to reverse the first surface and the second surface, wherein the first printing device includes:
a first conveyance unit configured to convey the printing medium;
a first printing unit configured to print an image by ejecting ink on the first surface of the printing medium conveyed by the first conveyance unit; and
a first control unit,
wherein the first control unit includes:
a first printing control unit configured to control operation of the first printing unit; and
a first conveyance control unit configured to control operation of the first conveyance unit,
the first printing control unit includes a first printing interruption control unit configured to control, when a printing interruption cause occurs, the first printing unit to interrupt printing operation after completing printing of a first printing-interruption-time last page being printed on the first surface of the printing medium, and further printing a first position mark indicating a printing resumption position on a first printing resumption page that is a next page of the first printing-interruption-time last page,
the first conveyance control unit includes a first conveyance speed control unit configured to control, after interruption of printing operation of the first printing unit, the first conveyance unit to start deceleration of a conveyance speed of the printing medium and stop conveyance of the printing medium,
the second printing device includes:
a second conveyance unit configured to convey the printing medium;
a second printing unit configured to print an image by ejecting ink on the second surface of the printing medium conveyed by the second conveyance unit; and
a second control unit,
the second control unit includes:
a second printing control unit configured to control operation of the second printing unit; and
a second conveyance control unit configured to control operation of the second conveyance unit,
the second printing control unit includes a second printing interruption control unit configured to control, when a printing interruption cause occurs, the second printing unit to interrupt printing operation after completing printing of a second printing-interruption-time last page being printed on the second surface of the printing medium, and further printing a second position mark indicating a printing resumption position on a second printing resumption page that is a next page of the second printing-interruption-time last page, and
the second conveyance control unit includes a second conveyance speed control unit configured to control, after interruption of printing operation of the second printing unit, the second conveyance unit to start deceleration of a conveyance speed of the printing medium and stop conveyance of the printing medium.

According to the above-described configuration, when a printing interruption cause (a matter that should interrupt printing) occurs while an image is being printed on the printing medium, the first printing unit and the second printing unit complete printing of all the pages being printed, and further, stop printing operation after printing only the position marks (the first position mark and the second position mark) indicating the pages to be printed first when the printing is resumed. Thereafter, the first conveyance control unit and the second conveyance control unit respectively control the first conveyance unit and the second conveyance unit to decelerate and stop the printing medium. Thereby, the printing is resumed from the pages on which the position marks (the first position mark and the second position mark) are printed, and no blank portion appear between the pages printed last before printing interruption and the pages printed first after printing resumption. As a result, the occurrence of damaged paper is prevented.

These and other objects, features, modes, and advantageous effects of the present invention will become more apparent from the following detailed description of the present invention with reference to the accompanying drawings.

DETAILED DESCRIPTION OF PREFERRED EMBODIMENTS

Hereinafter, embodiments of the present invention will be described with reference to the accompanying drawings.

1. First Embodiment

<1.1 Configuration of Printing Device>

Figure 1:
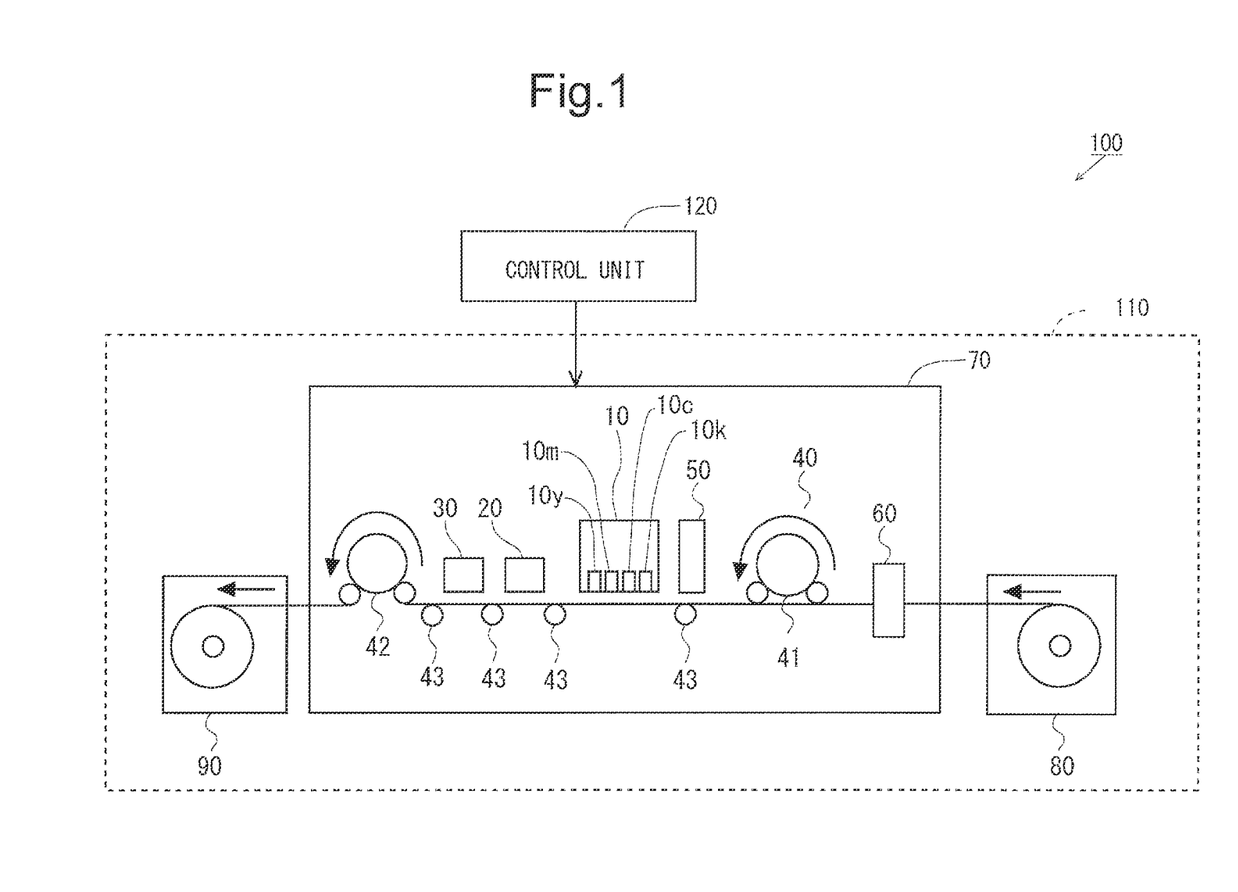
FIG. 1 is a schematic diagram showing an overall configuration of a printing device according to a first embodiment of the present invention.

FIG. 1 is a schematic diagram showing an overall configuration of an inkjet printing device 100 according to a first embodiment of the present invention. As shown in FIG. 1, the inkjet printing device 100 includes a printer body 110 and a control unit 120. The printer body 110 includes a paper feeding unit 80 configured to hold a long belt-shaped printing medium consisting of continuous paper rotatably around a horizontal axis and supply the same, a printing mechanism 70 configured to print an image by ejecting ink such as, for example, aqueous ink on the printing medium supplied from the paper feeding unit 80 and to inspect the image after the printing medium is dried, and a winding unit 90 configured to wind up the outputted continuous paper on which printing is completed. The control unit 120 controls operation of the printer body 110 so that the image is printed on the printing medium on the basis of job data given from outside.

The printing mechanism 70 includes a first driving roller 41 configured to convey the printing medium supplied from the paper feeding unit 80 to an inside of the printing mechanism a plurality of conveying rollers (also simply referred to as "rollers") 43 for conveying the printing medium inside the printing mechanism 70, a printing unit 10 configured to perform printing by ejecting ink (e.g., aqueous ink) on the continuous paper, a drying unit 20 configured to dry the printing medium by applying hot air to the printed printing medium, an inspection unit 30 configured to inspect the printed image by collating the image printed on the printing medium with image data, and a second driving roller 42 for outputting the printing medium from the printing mechanism 70. The first driving roller 41 and the second driving roller 42 are driven in conjunction with each other by a motor (not shown). By switching a rotation direction of the motor, regarding the printing medium, conveyance to an upstream side in a conveyance direction and conveyance to a downstream side in the conveyance direction are switched. The first driving roller 41, the second driving roller 42, and the conveying rollers 43 configure a conveyance unit 40.

The printing mechanism 70 is provided with a reading unit 50 configured to read a position mark printed on a printing resumption page when printing is resumed after interruption. The reading unit 50 is disposed in the vicinity of the printing unit 10 and on the upstream side in the conveyance direction with respect to the printing unit 10 and on the downstream side in the conveyance direction with respect to a position of the position mark after the printing medium is rewound. A reason why the reading unit 50 is disposed on the downstream side in the conveyance direction with respect to the position of the position mark after the printing medium is rewound is that the position of the position mark printed on the printing started page can be surely recognized when the printing is resumed after the printing medium is rewound to the upstream side. After the printing resumption, when the position mark printed on the printing resumption page passes through the reading unit 50, the reading unit 50 notifies the control unit 120 that the printing resumption page has passed. As a result, the control unit 120 can control the printing unit 10 so that the printing is resumed from the printing resumption page (page to be printed first after printing resumption).

In addition, a rotary encoder 60 is disposed on the further upstream side in the conveyance direction with respect to the printing unit 10. The rotary encoder 60 can measure a moving distance of the printing medium by counting a number of rotations of the first driving roller 41. Location of the rotary encoder 60 is not limited to the vicinity of an entrance of the printing mechanism 70, and the rotary encoder 60 may be disposed in the vicinity of the second driving roller 42.

Although the configuration of the inkjet printing device 100 that performs color printing is shown in FIG. 1 as the configuration of the printing device 100, an inkjet printing device configured to perform monochrome printing or a printing device configured to perform printing by another printing method can also be adopted.

Figure 2:
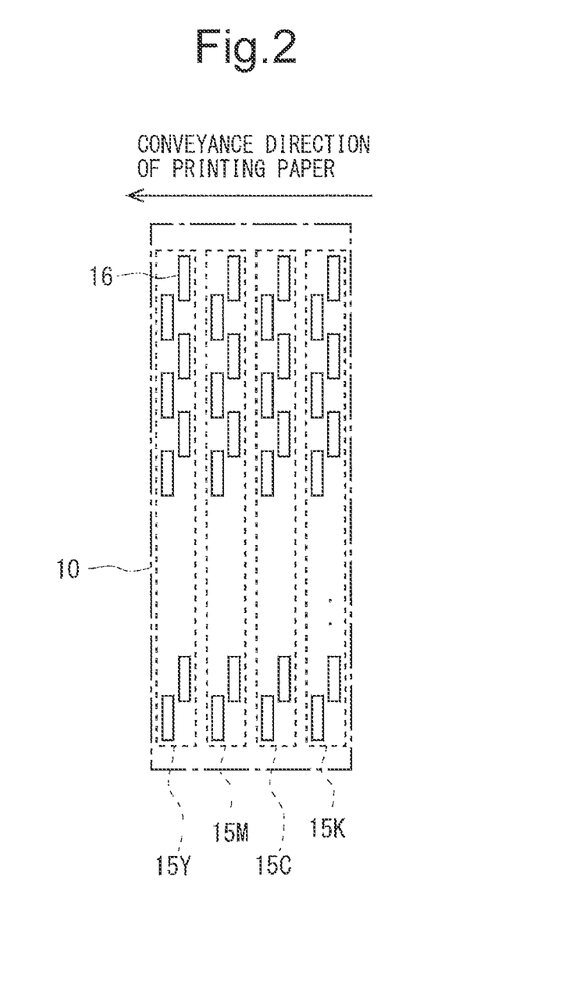
FIG. 2 is a plan view showing one configuration example of a printing unit included in the printing device shown in FIG. 1.

FIG. 2 is a plan view showing one configuration example of the printing unit 10 included in the printing device 100 shown in FIG. 1. As shown in FIG. 2, the printing unit 10 is configured of inkjet head arrays 15K, 15C, 15M, and 15Y for a K color (black), a C color (cyan color), an M color (magenta color), and a Y color (yellow color) arranged in line in the conveyance direction of the printing medium. Each of the inkjet head arrays is configured of a plurality of inkjet heads 16 arranged in zigzag. Each of the inkjet heads 16 includes a large number of nozzles configured to eject ink. Each of the nozzles of the inkjet heads 16 included in the inkjet head array 15K for the K color ejects ink of the K color, each of the nozzles of the inkjet heads 16 included in the inkjet head array 15C for the C color ejects ink of the C color, each of the nozzles of the inkjet heads 16 included in the inkjet head array 15M for the M color ejects ink of the M color, and each of the nozzles of the inkjet heads 16 included in the inkjet head array 15Y for the Y color ejects ink of the Y color.

In the above description, a case where printing is performed by ejecting aqueous ink is exemplified. However, the present invention is not limited thereto, and the present invention can also be applied to a case where an image is printed using UV ink (ultraviolet curing ink). Note that, in the case of using the UV ink, it is necessary to cure the UV ink by ultraviolet irradiation in order to fix the printed image on the printing medium. Since the present invention can be applied to the case of performing printing using either of the aqueous ink and the UV ink as described above, a term "fixing unit" may be used instead of the "drying unit". In addition, while drying treatment is performed in the case where the aqueous ink is used, curing treatment is performed in the case where the UV ink is used, and thus a term "fixing treatment" may be used as a term including the drying treatment and the curing treatment.

The inspection unit 30 captures an image after drying by the drying unit 20 by an imaging element, and performs inspection by comparing the captured image with the image data sent from outside. However, the present invention is not limited thereto, and the configuration may be such that an image and a barcode representing the image are printed by the image the printing unit 10 and the inspection unit 30 performs inspection by reading the barcode and collating whether or not the image represented by the barcode matches the printed image. Since the barcode can be read even if the printed barcode is not dried, it is also possible that the barcode is read immediately after printing and the collation is performed using the barcode. In the case where the collation using the barcode is performed before the printed image is dried, a positional relationship between the drying unit 20 and the inspection unit 30 is opposite to the positional relationship shown in FIG. 1.

<1.2 Hardware Configuration of Control Unit>

Figure 3:
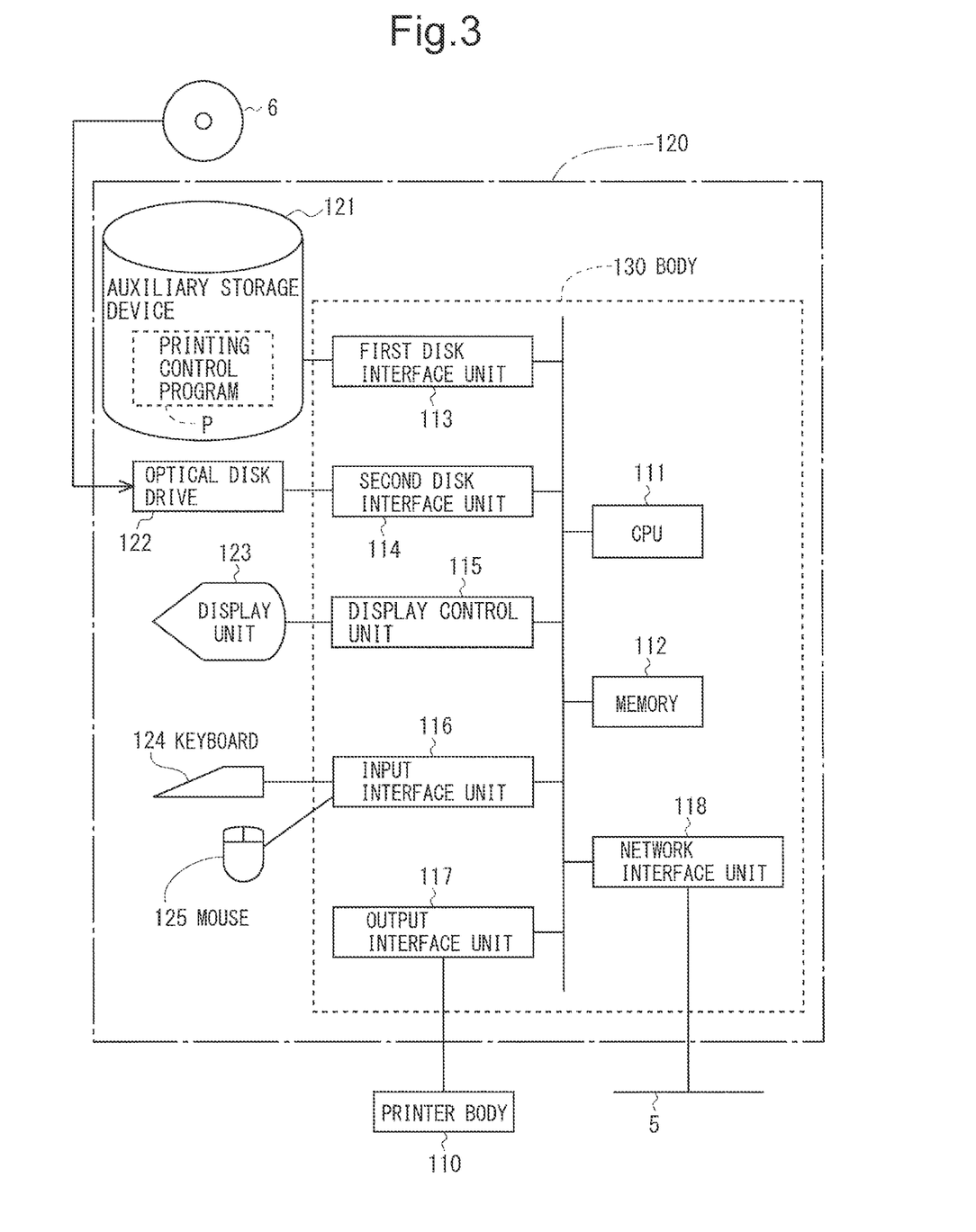
FIG. 3 is a block diagram showing a hardware configuration of the control unit included in the printing device shown in FIG. 1.

FIG. 3 is a block diagram showing a hardware configuration of the control unit 120 included in the printing device shown in FIG. 1. As shown in FIG. 3, the control unit 120 includes a body 130, an auxiliary storage device 121, an optical disk drive 122, a display unit 123, a keyboard 124, a mouse 125, and the like. The body 130 includes a CPU 111, a memory 112, a first disk interface unit 113, a second disk interface unit 114, a display control unit 115, an input interface unit 116, an output interface unit 117, and a network interface unit 118. The CPU 111, the memory 112, the first disk interface unit 113, the second disk interface unit 114, the display control unit 115, the input interface unit 116, the output interface unit 117, and the network interface unit 118 are connected to one another via a system bus. The auxiliary storage device 121 is connected to the first disk interface unit 113. The optical disk drive 122 is connected to the second disk interface unit 114. The display unit (display device) 123 is connected to the display control unit 115. The keyboard 124 and the mouse 125 are connected to the input interface unit 116. The printer body 110 is connected to the output interface unit 117 via a communication cable. A communication line 5 is connected to the network interface unit 118. The auxiliary storage device 121 is a magnetic disk device or the like. An optical disk 6 as a computer-readable recording medium such as a CD-ROM or a DVD-ROM is inserted into the optical disk drive 122. The display unit 123 is a liquid crystal display or the like. The display unit 123 is used to display information desired by an operator. The keyboard 124 and the mouse 125 are used by a worker to input an instruction to this control unit 120.

The auxiliary storage device 121 stores a printing control program (program for controlling execution of printing processing by the printer body 110) P. The CPU 111 implements various functions of the control unit 120 by reading the printing control program P stored in the auxiliary storage device 121 into the memory 112 and executing the program. The memory 112 includes a RAM and a ROM. The memory 112 functions as a work area for the CPU 111 to execute the printing control program P stored in the auxiliary storage device 121. The printing control program P is provided by being stored in the computer-readable recording medium (non-transitory recording medium). That is, for example, the user purchases the optical disk 6 as a recording medium of the printing control program P, inserts the optical disk 6 into the optical disk drive 122, reads the printing control program P from the optical disk 6, and installs the printing control program P in the auxiliary storage device 121. Alternatively, the printing control program P transmitted via the communication line 5 may be received by the network interface unit 118 and installed in the auxiliary storage device 121.

Figure 4:
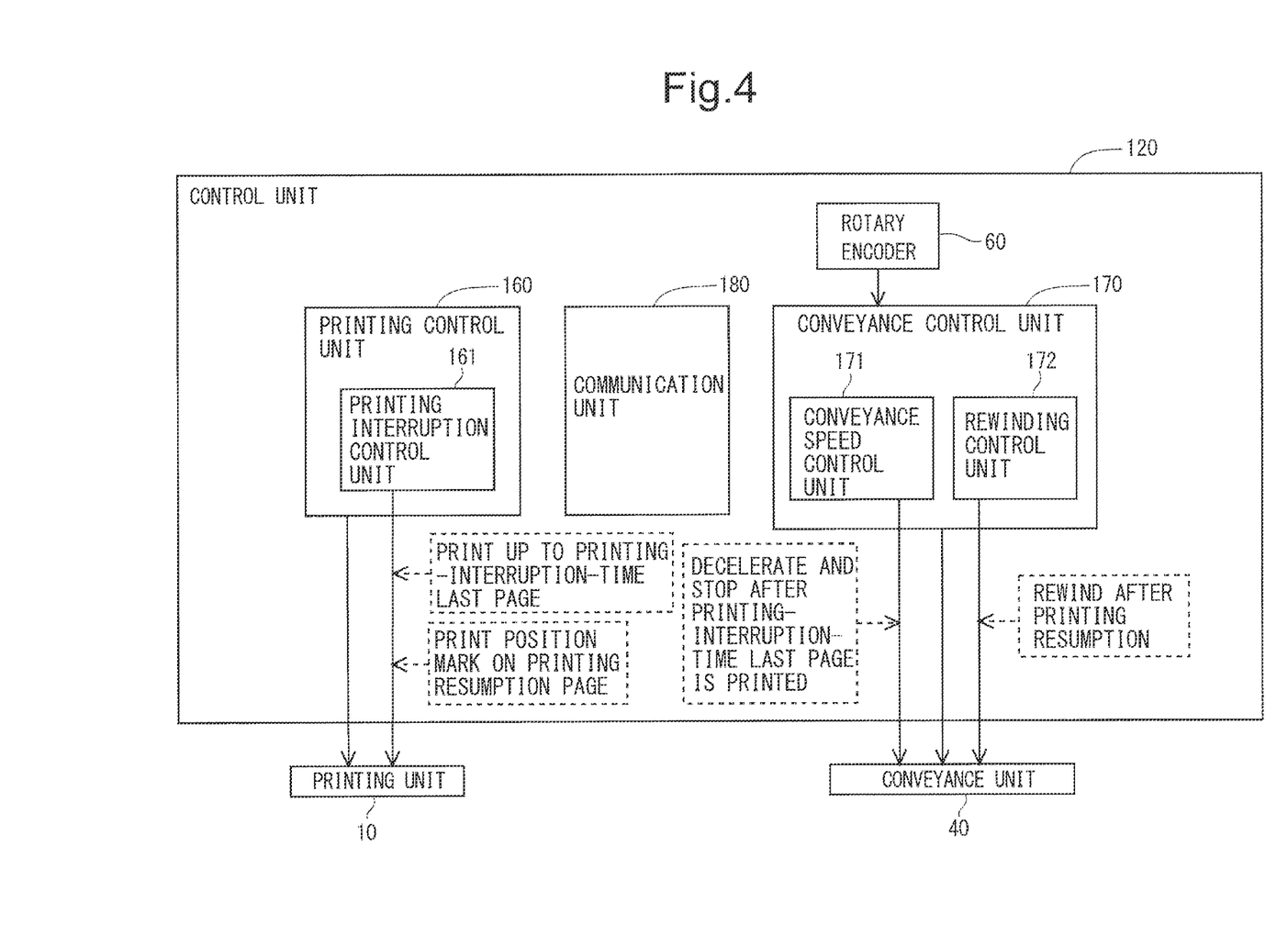
FIG. 4 is a functional block diagram showing a functional configuration of a control unit included in the printing device shown in FIG. 1.

FIG. 4 is a block diagram showing a schematic functional configuration of the control unit 120 implemented by executing the printing control program P. As shown in FIG. 4, the control unit 120 includes a printing control unit 160 configured to control operation of the printing unit 10, a conveyance control unit 170 configured to control operation of the conveyance unit 40, and a communication unit 180 for communicating a printing control status for the printing medium and a conveyance control status of the printing medium with a communication unit of a second printing device 100b described later, the communication being performed by using the communication line. While the control unit 120 further includes an inspection control unit configured to control operation of the inspection unit 30 and a drying control unit configured to control operation of the drying unit 20, these are omitted in FIG. 4.

The printing control unit 160 includes a printing interruption control unit 161. When a printing interruption cause occurs, the printing interruption control unit 161 controls the printing unit 10 to interrupt printing operation after completing printing up to a printing-interruption-time last page, which is the last page among pages that are being printed on the printing medium, and further printing a position mark indicating a printing resumption position on a printing resumption page (page to be printed first after the printing resumption), which is the next page of the printing-interruption-time last page. Other operations of the printing unit 10 are directly controlled by the printing control unit 160.

The conveyance control unit 170 includes a conveyance speed control unit 171 and a rewinding control unit 172. When a printing interruption cause occurs, after the printing up to the printing-interruption-time last page is performed and printing operation of the printing unit 10 is interrupted, the conveyance speed control unit 171 controls the conveyance unit to start decelerating a conveyance speed of the printing medium, and further to stop the conveyance of the printing medium after the printing-interruption-time last page is conveyed to the drying unit 20. Thereby, the pages printed in a period from the time of the occurrence of the printing interruption cause to the time of the printing interruption are dried.

The rewinding control unit 172 controls the conveyance unit 40 so that the printing medium is rewound until a distance from a position (printing resumption position) of the position mark printed on the printing resumption page to the printing unit 10 becomes equal to or longer than an acceleration distance required to obtain a conveyance speed that allows the printing resumption page to be printed, before the conveyance of the printing medium is resumed for printing resumption after printing operation is interrupted. Specifically, a rewinding distance of the printing medium is a total distance of a deceleration distance from start of deceleration of the printing medium to stop of the conveyance of the printing medium, a length of the printing unit 10 in the conveyance direction, and the acceleration distance required to accelerate the printing medium to a printable speed after printing resumption. The rewinding distance of the printing medium is measured by the rotary encoder 60 counting a number of rotations of the first driving roller 41. Other operations of the conveyance unit 40 are directly controlled by the conveyance control unit 170.

<1.3 Procedure from Printing Interruption to Resumption>
<1.3.1 Outline>

Figure 5:
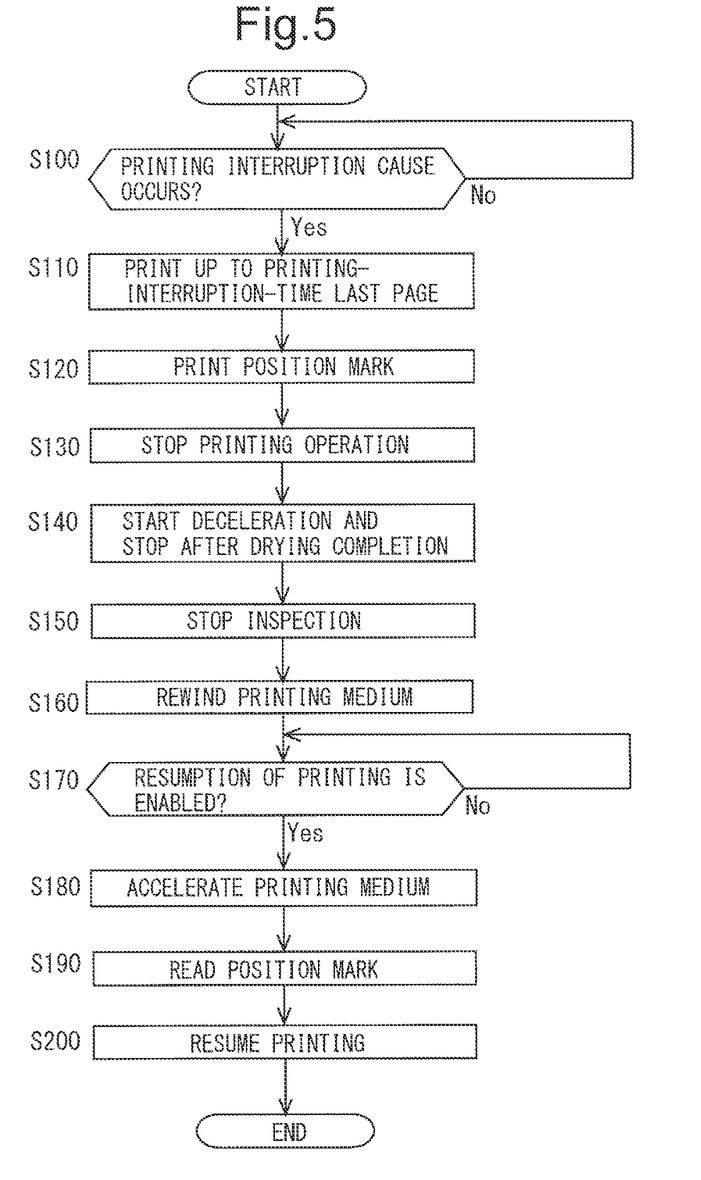
FIG. 5 is a flowchart showing a procedure of the printing device shown in FIG. 1 from occurrence of a printing interruption cause to printing resumption.

FIG. 5 is a flowchart showing a procedure of the printing device 100 shown in FIG. 1 from occurrence of a printing interruption cause to printing resumption. An outline of a procedure from the occurrence of the printing interruption cause to the resumption of printing will be described with reference to the flowchart shown in FIG. 5.

In the printing device 100, when an image is being printed on the printing medium, whether or not a printing interruption cause has occurred is monitored (step S100). When the printing interruption cause does not occur, whether or not a printing interruption cause occurs is further monitored while continuing printing. When a printing interruption cause occurs, processing proceeds to step S110, and the printing unit 10 completes printing of all the pages being printed.

After completion of printing of all the pages being printed at the time of occurrence of the printing interruption cause, the printing unit 10 prints the position mark on a page (printing resumption page) next to the printing-interruption-time last page, the position mark indicating that the page is the first page at the time of printing resumption (step S120). When the printing of the position mark is completed, the printing unit 10 stops printing operation (step S130). Next, the conveyance unit 40 starts to decelerate the conveyance speed, conveys all the pages for which printing is completed after the occurrence of the printing interruption cause to the drying unit 20, and stops the conveyance of the printing medium after the completion of the drying of all the pages for which printing is completed after the occurrence of the printing interruption cause (step S140). The inspection by the inspection unit 30 is then stopped (step S150). Thereafter, the conveyance unit 40 rewinds the printing medium so that the printing resumption page is positioned at the printing resumption position on the upstream side (step S160).

In step S170, the printing device 100 stops the operation of the printing mechanism 70 and waits until there is a printing resumption instruction. When the printing resumption instruction is given, the conveyance unit 40 conveys the printing medium to the downstream side in the conveyance direction while accelerating the printing medium (step S180). As a result, the conveyance speed is accelerated to the printable speed before the printing resumption page reaches the printing unit 10, and the printing unit 10 is enabled to normally perform printing in step S200 described later.

Thereafter, the position mark printed on the printing resumption page of the printing medium is read by the reading unit 50 disposed in the vicinity of the printing unit 10, and the printing unit 10 is notified that the printing resumption page has passed through the reading unit 50 (step S190). Then, the printing unit 10 receives the notification from the reading unit 50 and resumes printing from the printing resumption page (step S200).

<1.3.2 Details of Procedure>

Figure 6:
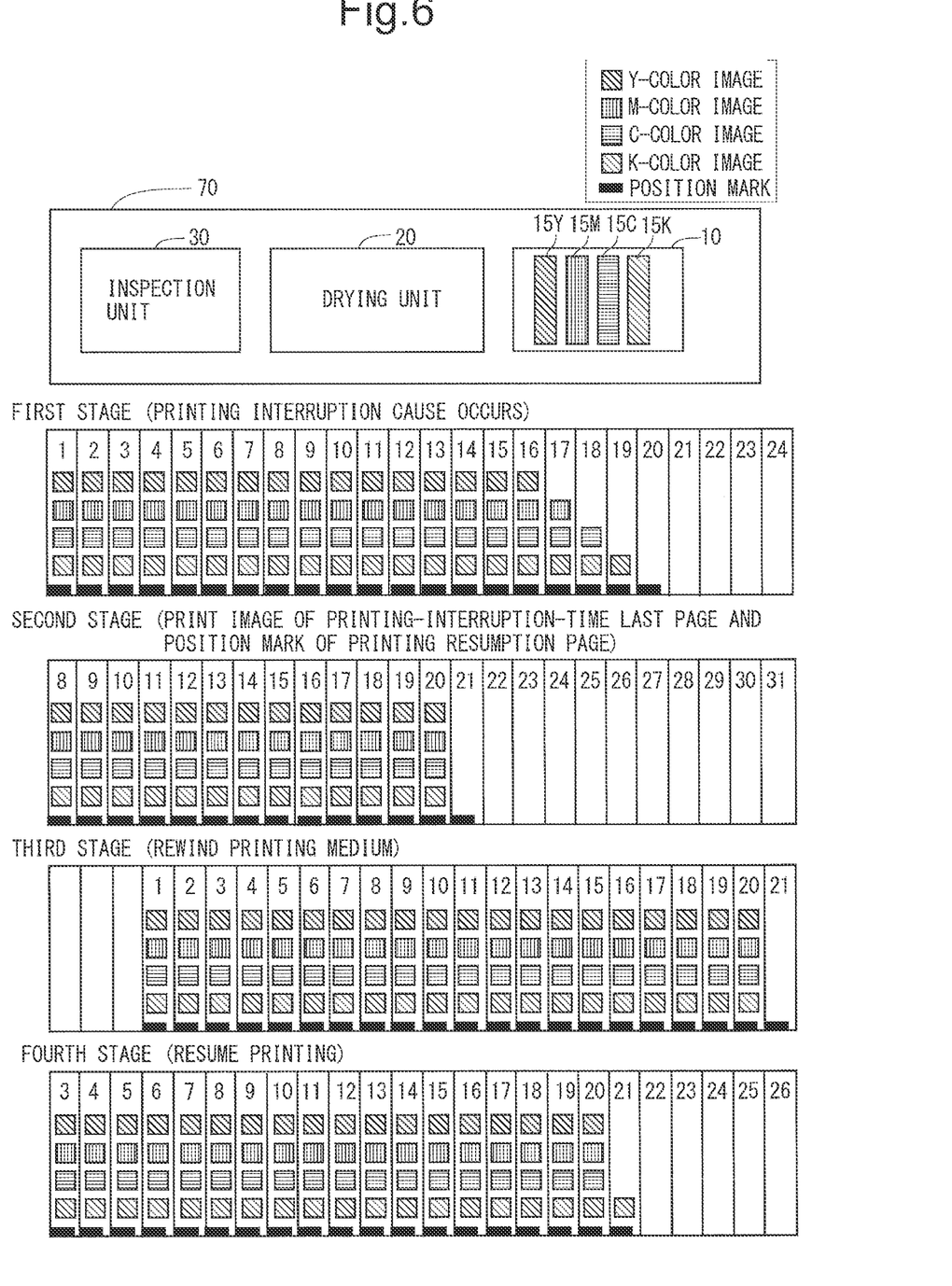
FIG. 6 is a diagram showing changes in the printing medium in the printing device shown in FIG. 1 from the time of the occurrence of the printing interruption cause to the time of printing resumption.

FIG. 6 is a diagram showing changes in the printing medium in the printing device 100 shown in FIG. 1 from the time of the occurrence of the printing interruption cause to the time of printing resumption. With reference to FIG. 6, a process from the time of the printing interruption to the time of printing resumption will be divided into four stages of a first stage to a fourth stage, and operation of the printing mechanism 70 and a printing state of the printing medium in each of the stages will be described.

Regarding FIG. 6, a numeral attached to a top of each page represents a page number of each of the pages. In the printing unit 10, the inkjet head arrays 15K, 15C, 15M, and for the K color, the C color, the M color, and the Y color are disposed in this order from the upstream side in the conveyance direction toward the downstream side in the conveyance direction, and thus the printing of each of the pages is also performed in this order. The position mark is printed with the K color ink ejected from the inkjet head array for the K color. First, the position mark is printed, and then images of the K color, the C color, the M color, and the Y color are printed in this order. In FIG. 6, a progress status of printing can be grasped by the printing mark for each of the colors drawn in each of the pages.

Regarding the first stage, the printing medium when the printing interruption cause occurs during printing is shown. In this example, in each of pages 1 to 16, the position mark, and images of the K color, the C color, the M color, and the Y color are printed. That is, printing of the pages 1 to 16 is completed. As for the pages 1 to 6, the drying by the drying unit 20 is completed, and the inspection by the inspection unit 30 is being performed. As for the page 7, although the drying is completed, it has not yet been conveyed to the inspection unit 30. As for the pages 8 to 14, the drying by the drying unit 20 is being performed. As for the pages 15 and 16, printing is completed, and it will be conveyed to the drying unit 20.

Pages 17 to 20 are being printed in the printing unit 10. Specifically, as for the page 17, printing of the position mark and printing of the images of the three colors of K, C, and M are finished. As for the page 18, printing of the position mark and printing of the images of the two colors of K and C are finished. As for the page 19, printing of the position mark and printing of the image of K color are finished. As for the page 20, only the position mark is printed.

Regarding the second stage, the printing medium on which printing to be executed before interrupting the printing when the printing interruption cause occurs is completed is shown. Since the printing interruption cause occurred during printing of the position mark on the page 20, the images of the colors that have not yet been printed are sequentially printed for each of the pages 17 to 20 being printed. As a result, the images are printed on each of the pages up to the page 20, which is the printing-interruption-time last page. Furthermore, after only the position mark is printed on a page 21, which is the printing resumption page to be printed first at the time of printing resumption, the printing unit 10 stops printing operation. Next, deceleration of the conveyance speed of the printing medium is started, and each of the pages 17 to 20, on which printing is completed, is conveyed into the drying unit 20 while decelerating.

In the example shown in FIG. 6, the position marks are printed not only on the page 21, which is the printing resumption page, but also on the pages 1 to 20 on which the images are printed. However, the present invention is not limited thereto, and the configuration may be such that no position mark is printed on the pages on which the images are printed and the position mark is printed only on the printing resumption page. Furthermore, regarding the case where the position mark is printed also on each of the pages on which the images are printed, the position mark to be printed on the page 21, which is the printing resumption page, may be a mark having a shape different from that of the position mark printed on the other pages on which the images are printed.

Regarding the third stage, the printing medium in a rewound state to resume printing is shown. A position of the page 21, which is the printing resumption page, is a position at which a distance to the inkjet head array 15K for the K color on the most upstream side of the printing unit 10 is equal to or longer than a distance at which a speed that allows the printing resumption page to be printed by acceleration of the conveyance speed can be obtained, and is a position on the upstream side of the reading unit 50.

Regarding the fourth stage, the printing medium when printing of the page 21, which is the printing resumption page, is resumed is shown. The conveyance speed of the printing medium is accelerated to a printable state before the printing of the K color is started on the page 21 by the inkjet head array 15K for the K color of the printing unit 10. Upon reading the position mark printed on the page 21, the reading unit 50 notifies the printing unit 10 that the page 21 has passed. As a result, printing is resumed when the page 21 reaches the position of the inkjet head array 15K for the K color. Thereafter, similarly, by sequentially controlling the respective inkjet head arrays 15C, 15M, and 15Y for the C color, the M color, and the Y color while conveying the printing medium to the downstream side in the conveyance direction, the images of these colors are sequentially printed, and printing of the page 21 is completed. Similarly, images of the four colors are printed on a page 22 and subsequent pages.

Note that the inspection performed before the printing interruption is continued until the conveyance unit 40 is stopped even after the printing is interrupted. Therefore, after the printing resumption, the inspection does not need to be performed again for the page for which the inspection has already been completed, and the inspection may be performed only for the page for which the inspection is not completed when the conveyance unit 40 is stopped. However, the inspection may be performed again for the page for which the inspection has already been completed.

With respect to the example shown in FIG. 6, by performing printing as described above when the printing interruption cause occurs, a blank portion does not appear between the page on which the image is printed last after the occurrence of the printing interruption cause and the page 21 on which the image is printed first after the printing resumption. Therefore, the occurrence of damaged paper is prevented.

<1.4 Effect>

According to the present embodiment, when the printing interruption cause (a matter that should interrupt printing) occurs during printing of the image on the printing medium using the printing device 100, the printing unit 10 completes printing of the page being printed when the printing interruption cause occurred, and the printing medium is rewound after the printing medium is dried. After the printing interruption cause is resolved, the printing medium is accelerated to a printable speed, and printing is resumed from the printing resumption page on which the position mark is printed. Therefore, a blank portion does not appear between the printing-interruption-time last page, which is the page printed last before the printing interruption, and the printing resumption page, which is the page to be printed first after printing resumption. This prevents the occurrence of damaged paper.

2. Second Embodiment

<2.1 Configuration of Printing System>

Figure 7:
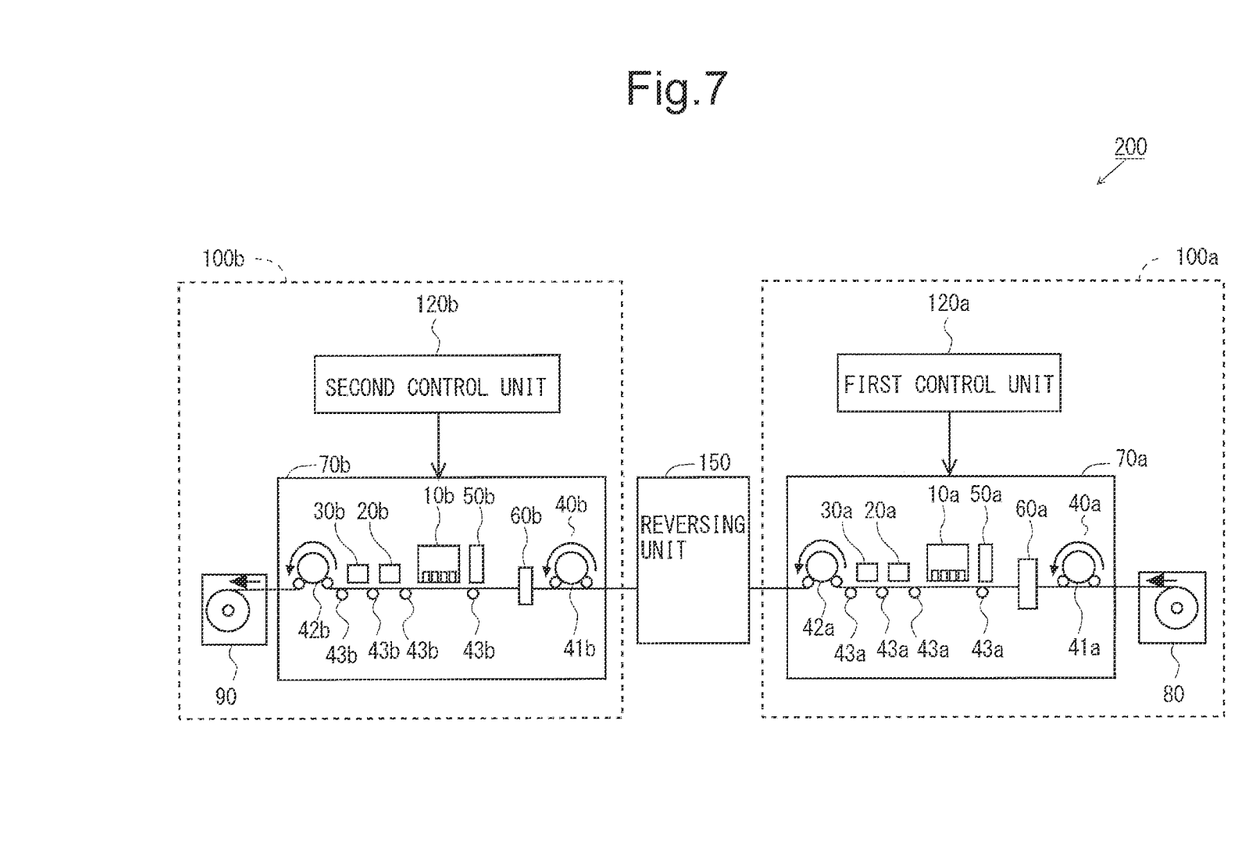
FIG. 7 is a schematic diagram showing an overall configuration of a printing system according to a second embodiment of the present invention.
Figure 8:
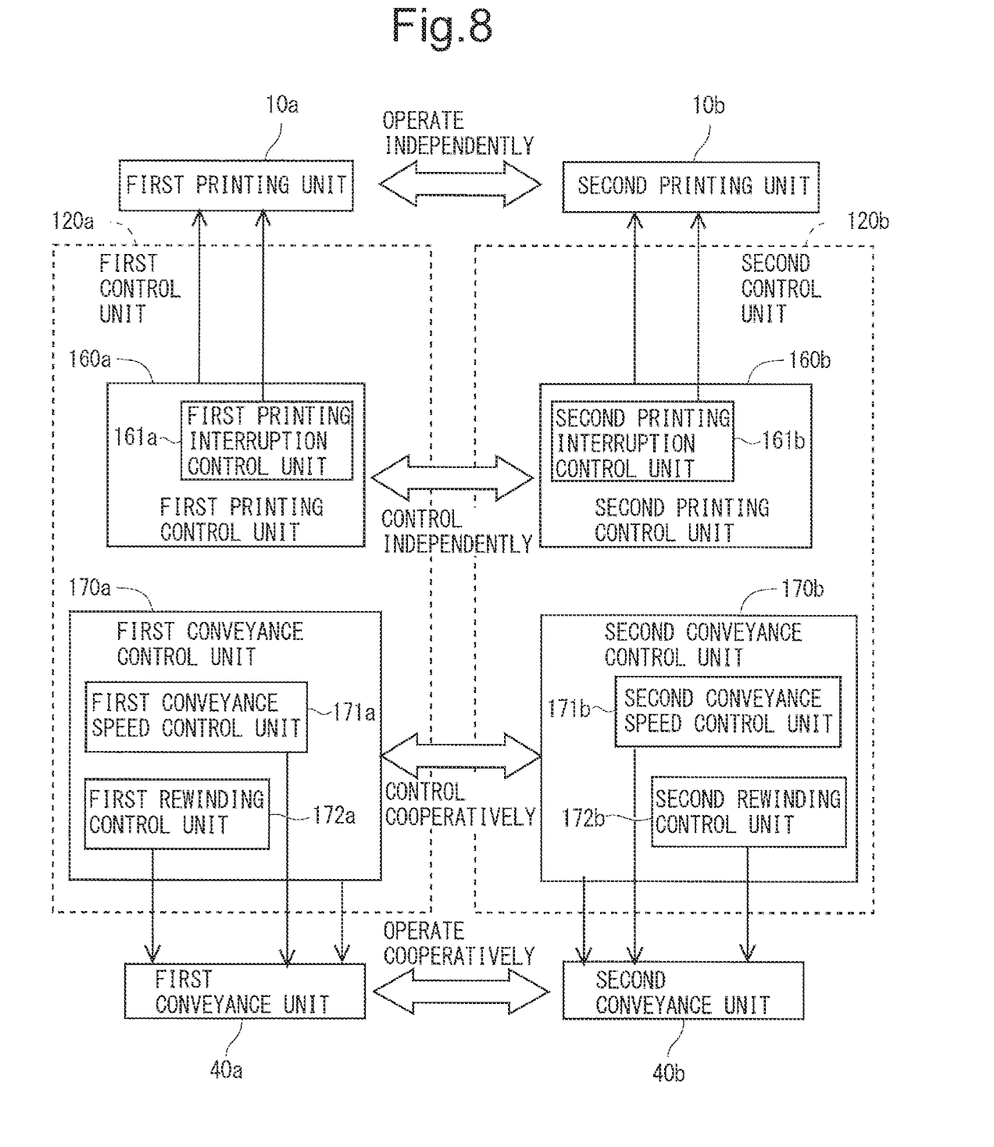
FIG. 8 is a block diagram showing a part of configurations of a first control unit and a second control unit included in the printing system shown in FIG. 7.

In the present embodiment, a printing system 200 in which two printing devices (a first printing device 100a and a second printing device 100b) are connected via a reversing unit 150 will be described. The two printing devices (the first printing device 100a and the second printing device 100b) configuring the printing system 200 both have the same configuration as the printing device 100 in the first embodiment. In FIGS. 7 and 8 described later, components of the first printing device 100a corresponding to the components of the printing device 100 in the first embodiment are denoted by adding "a" to ends of the reference numerals, and components of the second printing device 100b corresponding to the components of the printing device 100 in the first embodiment are denoted by adding "b" to ends of the reference numerals. This printing system 200, unlike the printing device 100 in the first embodiment, the paper feeding unit 80 is provided only in the first printing device 100a, and the winding unit is provided only in the second printing device 100b.

FIG. 7 is a schematic diagram showing an overall configuration of the printing system 200 according to the second embodiment of the present invention. As shown in FIG. 7, in the printing system 200 according to the present embodiment, the first printing device 100a configured to print an image on a front surface (a first surface) of a printing medium and the second printing device 100b configured to print an image on a back surface (a second surface) of the printing medium are connected in series via the reversing unit 150. Each of the first printing device 100a and the second printing device 100b is an inkjet printing device having the same configuration as the printing device 100 in the first embodiment. In the printing system 200, first, the image is printed on the first surface that is the front surface of the printing medium by the first printing device 100a, then the front surface and the back surface of the printing medium are reversed by the reversing unit 150, and then the image is printed on the second surface that is the back surface of the printing medium by the second printing device 100b.

The first printing device 100a includes a first control unit 120a, and a first printing mechanism 70a including a first printing unit 10a, a first drying unit 20a, and a first inspection unit 30a. The second printing device 100b includes a second control unit 120b, and a second printing mechanism including a second printing unit 10b, a second drying unit and a second inspection unit 30b.

FIG. 8 is a block diagram showing a part of the configurations of the first control unit 120a and the second control unit 120b included in the printing system 200 shown in FIG. 7. The first control unit 120a and the second control unit 120b are configured to be communicable via the communication unit 180 so as to be able to indicate operation statuses and control statuses of the devices to each other. As a result, the first control unit 120a and the second control unit 120b can cooperatively control the conveyance operation and the like of the printing medium between the first printing device 100a and the second printing device 100b. As shown in FIG. 8, the first control unit 120a includes a first printing control unit 160a configured to control the first printing unit 10a and a first conveyance control unit 170a configured to control the first conveyance unit 40a. The first printing control unit 160a includes a first printing interruption control unit 161a, and the first conveyance control unit 170a includes a first conveyance speed control unit 171a and a first rewinding control unit 172a. Similarly, the second control unit 120b includes a second printing control unit 160b and a second conveyance control unit 170b. The second printing control unit 160b includes a second printing interruption control unit 161b, and the second conveyance control unit 170b includes a second conveyance speed control unit 171b and a second rewinding control unit 172b. Hereinafter, a function of each of the components will be described.

When a printing interruption cause occurs, the first printing interruption control unit 161a controls the first printing unit 10a to interrupt printing operation after completing printing up to a first printing-interruption-time last page, which is a last page among pages that are being printed on the first surface of the printing medium, and further printing a first position mark indicating a printing resumption position on a first printing resumption page, which is a next page of the first printing-interruption-time last page. Similarly, the second printing interruption control unit 161b controls the second printing unit 10b to interrupt printing operation after completing printing up to a second printing-interruption-time last page and further printing a second position mark on a second printing resumption page. Thus, the first printing interruption control unit 161a and the second printing interruption control unit 161b independently control the first printing unit 10a and the second printing unit 10b, respectively.

No buffer part is provided in the first conveyance unit and the second conveyance unit 40b in the printing system 200. Therefore, when conveying the printing medium in the printing system 200, the first conveyance unit 40a and the second conveyance unit 40b need to simultaneously convey the printing medium in a same direction at a same speed. Therefore, the first conveyance control unit 170a and the second conveyance control unit 170b need to cooperatively control the first conveyance unit 40a and the second conveyance unit 40b, respectively, so that the printing medium is conveyed in the same direction at the same conveyance speed by the first conveyance unit 40a and the second conveyance unit 40b.

After the printing of the first position mark is completed, the first conveyance speed control unit 171a controls the first conveyance unit 40a to start to decelerate the conveyance speed of the printing medium and to convey the first printing-interruption-time last page to the first drying unit 20a. The second conveyance speed control unit 171b similarly controls the second conveyance unit 40b. In this regard, the first conveyance speed control unit 171a and the second conveyance speed control unit 171b cooperatively control the first conveyance unit 40a and the second conveyance unit 40b, respectively, until the first printing-interruption-time last page is conveyed to the first drying unit 20a and the second printing-interruption-time last page is conveyed to the second drying unit 20b.

The first rewinding control unit 172a and the second rewinding control unit 172b cooperatively control the first conveyance unit 40a and the second conveyance unit 40b, respectively, so that the printing medium is rewound after the drying of the first printing-interruption-time last page is completed in the first drying unit 20a and the drying of the second printing-interruption-time last page is completed in the second drying unit 20b. This allows the first conveyance unit 40a and the second conveyance unit 40b to cooperatively convey the printing medium. The first rewinding control unit 172a controls the first conveyance unit 40a so that the printing medium is rewound until a distance from the printing resumption position of the first printing resumption page to the first printing unit 10a becomes equal to or longer than an acceleration distance required to obtain the conveyance speed that allows the first printing resumption page to be printed when the printing is resumed, and the second rewinding control unit 172b controls the second conveyance unit 40b so that the printing medium is rewound until a distance from the printing resumption position of the second printing resumption page to the second printing unit 10b becomes equal to or longer than an acceleration distance required to obtain the conveyance speed that allows the second printing resumption page to be printed when printing is resumed.

Although not shown in FIG. 8, the first control unit 120a includes a first inspection control unit configured to control the inspection by the first inspection unit 30a, and the second control unit 120b includes a second inspection control unit configured to control the inspection by the second inspection unit 30b. The first inspection control unit and the second inspection control unit control the first inspection unit 30a and the second inspection unit 30b, respectively, to inspect all the pages for which the inspection of the images printed on the printing medium is not completed, after the conveyance of the printing medium is resumed.

A first reading unit 50a configured to read the first position mark is disposed in the vicinity of the first printing unit 10a of the first printing device 100a, and on an upstream side in a conveyance direction with respect to the first printing unit 10a and on a downstream side in the conveyance direction with respect to a position of the first position mark after the printing medium is rewound. Similarly, a second reading unit 50b configured to read the second position mark is disposed in the vicinity of the second printing unit 10b of the second printing device 100b, and on an upstream side in a conveyance direction with respect to the second printing unit 10b and on a downstream side in the conveyance direction with respect to a position of the second position mark after the printing medium is rewound. After the conveyance resumption of the printing medium, the first reading unit 50a reads the first position mark printed on the printing medium, and notifies the first printing unit 10a via the first printing control unit 160a that the first printing resumption page from which printing is to be resumed has passed. Similarly, the second reading unit 50b notifies the second printing unit 10b via the second printing control unit 160b that the second printing resumption page from which printing is to be resumed has passed.

In addition, the first printing device 100a and the second printing device 100b include a first rotary encoder 60a and a second rotary encoder 60b, respectively. The first rotary encoder 60a finds a conveyance distance of the printing medium by counting a number of rotations of the first driving roller 41a. Similarly, the second rotary encoder 60b also finds a conveyance distance of the printing medium. A total distance of a deceleration distance, a rewinding distance, and an acceleration distance required in each of the first printing device 100a and the second printing device 100b is found by each of the first rotary encoder 60a and the second rotary encoder 60b.

<2.2 Outline of Procedure from Printing Interruption to Resumption>

Figure 9:
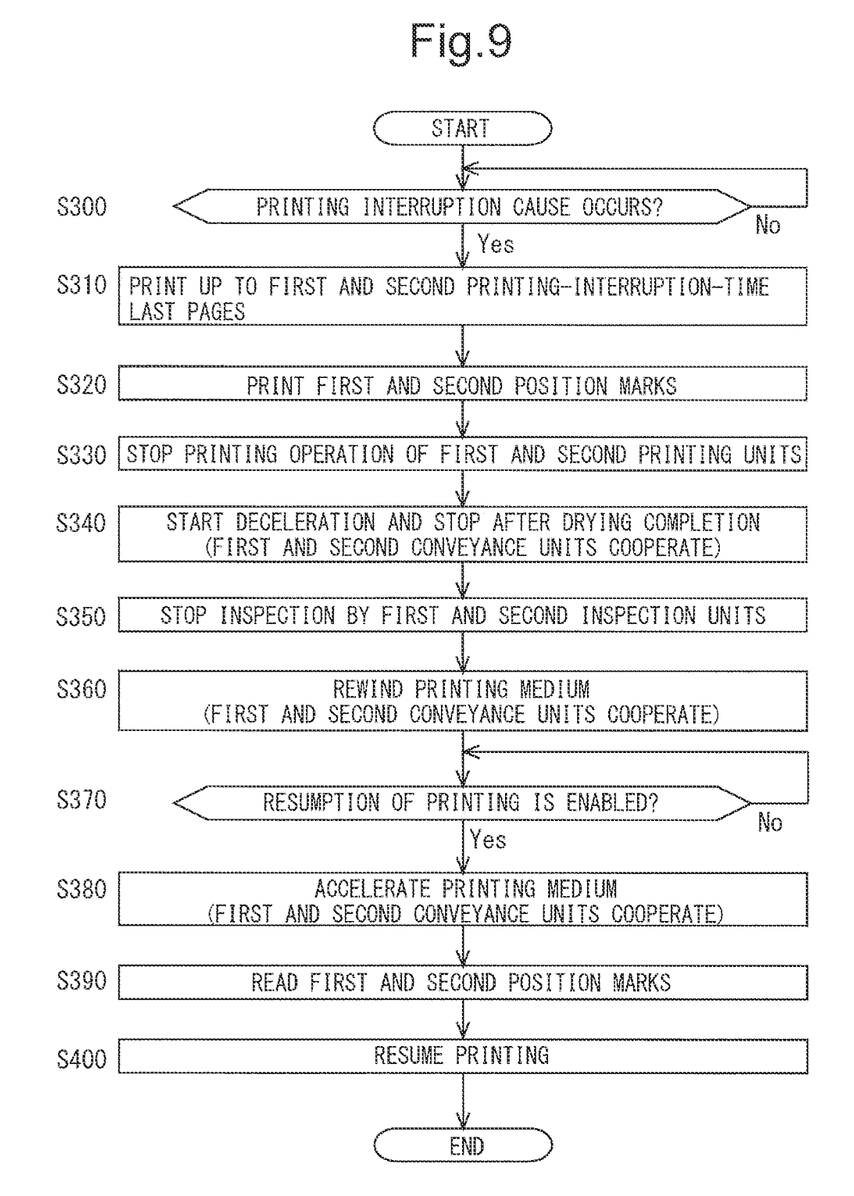
FIG. 9 is a flowchart showing a procedure of a first printing device and a second printing device from occurrence of a printing interruption cause to printing resumption.

FIG. 9 is a flowchart showing a procedure of the first printing device 100a and the second printing device 100b from occurrence of a printing interruption cause to printing resumption. An outline of the procedure from the occurrence of the printing interruption cause to the printing resumption will be described with reference to the flowchart shown in FIG. 9.

In the printing system 200 including the first printing device 100a and the second printing device 100b, when images are being printed on a printing medium, whether or not a printing interruption cause has occurred is monitored (step S300). When the printing interruption cause does not occur, whether or not a printing interruption cause occurs is further monitored while continuing printing. When a printing interruption cause occurs, processing proceeds to step S310, and each of the first printing unit 10a and the second printing unit 10b completes printing of all the pages being printed.

After completion of printing up to the first printing-interruption-time last page, the first position mark is printed on the first printing resumption page in the first printing device 100a, and after completion of printing up to the second printing-interruption-time last page, the second position mark is printed on the second printing resumption page in the second printing device 100b (S320). After completion of printing of the first position mark, the first printing unit 10a stops printing operation, and after completion of printing of the second position mark, the second printing unit 10b stops printing operation (step S330). Next, the first conveyance unit 40a and the second conveyance unit 40b cooperatively start to decelerate the conveyance speed of the printing medium, performs conveyance of the first printing-interruption-time last page to the first drying unit 20a and conveyance of the second printing-interruption-time last page to the second drying unit 20b, respectively, and stop the conveyance of the printing medium after completion of drying (step S340). Then, the image inspection by the first inspection unit 30a and the image inspection by the second inspection unit 30b are stopped (step S350).

Thereafter, the first conveyance unit 40a and the second conveyance unit 40b cooperatively rewind the printing medium so that the printing resumption pages(the first printing resumption page and the second printing resumption page) are positioned at the printing resumption positions on the upstream side (step S360). In step S370, the first printing device 100a and the second printing device 100b stop the operation of the first printing mechanism 70a and the second printing mechanism 70b, respectively, and wait until there is a printing resumption instruction. When the printing resumption instruction is given, the first conveyance unit 40a and the second conveyance unit 40b cooperatively convey the printing medium to the downstream side in the conveyance direction while accelerating the printing medium (step S380). As a result, the conveyance speed is accelerated to the printable speed before the first printing resumption page reaches the first printing unit 10a and the second printing resumption page reaches the second printing unit 10b, and the first printing unit 10a and the second printing unit 10b are enabled to normally perform printing in step S400 described later.

Thereafter, the first position mark printed on a front surface side is read by the first reading unit 50a, the first printing unit 10a is notified that the first printing resumption page has passed through the first reading unit 50a, the second position mark printed on a back surface side is read by the second reading unit 50b reads, and the second printing unit 10b is notified that the second printing resumption page has passed through the second reading unit 50b (step S390). Then, the first printing unit 10a and the second printing unit 10b resume printing from the first printing resumption page and the second printing resumption page, respectively (step S400).

<2.3 Effect>

According to the present embodiment, in the case where printing is performed on the front surface and the back surface of the printing medium by connecting the first printing device 100a and the second printing device 100b, for neither of the front surface nor the back surface of the printing medium, a blank portion appears between the page printed last before printing interruption and the page printed first after printing resumption. This prevents the occurrence of damaged paper.

3. Others

While the present invention has been described in detail above, the above description is illustrative in all aspects and is not restrictive. It is understood that numerous other modifications and variations can be devised without departing from the scope of the invention.

What is claimed is:

1. A printing system comprising: a first printing device configured to print a first image on a first surface of a printing medium including the first surface and a second surface that is a back surface of the first surface; a second printing device configured to print a second image on the second surface; and a reversing unit provided between the first printing device and the second printing device and configured to reverse the first surface and the second surface,
wherein the first printing device includes:
a first conveyance unit configured to convey the printing medium;
a first printing unit configured to print an image by ejecting ink on the first surface of the printing medium conveyed by the first conveyance unit; and
a first control unit,
wherein the first control unit includes:
a first printing control unit configured to control operation of the first printing unit; and
a first conveyance control unit configured to control operation of the first conveyance unit,
the first printing control unit includes a first printing interruption control unit configured to control, when a printing interruption cause occurs, the first printing unit to interrupt printing operation after completing printing of a first printing-interruption-time last page being printed on the first surface of the printing medium, and further printing a first position mark indicating a printing resumption position on a first printing resumption page that is a next page of the first printing-interruption-time last page,
the first conveyance control unit includes a first conveyance speed control unit configured to control, after interruption of printing operation of the first printing unit, the first conveyance unit to start deceleration of a conveyance speed of the printing medium and stop conveyance of the printing medium,
the second printing device includes:
a second conveyance unit configured to convey the printing medium;
a second printing unit configured to print an image by ejecting ink on the second surface of the printing medium conveyed by the second conveyance unit; and
a second control unit,
the second control unit includes:
a second printing control unit configured to control operation of the second printing unit; and
a second conveyance control unit configured to control operation of the second conveyance unit,
the second printing control unit includes a second printing interruption control unit configured to control, when a printing interruption cause occurs, the second printing unit to interrupt printing operation after completing printing of a second printing-interruption-time last page being printed on the second surface of the printing medium, and further printing a second position mark indicating a printing resumption position on a second printing resumption page that is a next page of the second printing-interruption-time last page,
the second conveyance control unit includes a second conveyance speed control unit configured to control, after interruption of printing operation of the second printing unit, the second conveyance unit to start deceleration of a conveyance speed of the printing medium and stop conveyance of the printing medium,
the first printing interruption control unit and the second printing interruption control unit control the first printing unit and the second printing unit respectively to interrupt printing operation after completing printing of the first printing-interruption-time last page and the second printing-interruption-time last page and further printing the first position mark and the second position mark, and
the first conveyance speed control unit and the second conveyance speed control unit cooperatively control, after completion of printing of the first position mark and the second position mark, the first conveyance unit and the second conveyance unit to start deceleration of the conveyance speed of the printing medium and stop the conveyance of the printing medium.

2. The printing system according to claim 1, wherein the first printing device further includes a first fixing unit configured to fix an image printed on the first surface of the printing medium by the first printing unit to the printing medium,
the first conveyance speed control unit controls the first conveyance unit so that the first printing-interruption-time last page is conveyed to the first fixing unit when causing the first conveyance unit to stop conveyance of the printing medium,
the second printing device further includes a second fixing unit configured to fix an image printed on the second surface of the printing medium by the second printing unit to the printing medium, and the second conveyance speed control unit controls the second conveyance unit so that the second printing-interruption-time last page is conveyed to the second fixing unit when causing the second conveyance unit to stop conveyance of the printing medium.

3. The printing system according to claim 2, wherein the first conveyance control unit includes a first rewinding control unit configured to control the first conveyance unit so that the printing medium is rewound after fixing processing on the first printing-interruption-time last page by the first fixing unit and fixing processing on the second printing-interruption-time last page by the second fixing unit are completed, and the second conveyance control unit includes a second rewinding control unit configured to control the second conveyance unit so that the printing medium is rewound after the fixing processing on the first printing-interruption-time last page by the first fixing unit and the fixing processing on the second printing-interruption-time last page by the second fixing unit are completed.

4. The printing system according to claim 3, wherein before the conveyance of the printing medium is resumed for printing resumption after printing operation of the first printing unit and the second printing unit are interrupted, the first rewinding control unit controls the first conveyance unit so that the printing medium is rewound until a distance from the printing resumption position of the first printing resumption page to the first printing unit becomes equal to or longer than an acceleration distance required to obtain a conveyance speed that allows the first printing resumption page to be printed, and the second rewinding control unit controls the second conveyance unit so that the printing medium is rewound until a distance from the printing resumption position of the second printing resumption page to the second printing unit becomes equal to or longer than an acceleration distance required to obtain a conveyance speed that allows the second printing resumption page to be printed.

5. The printing system according to claim 4, wherein the first printing device further includes a first inspection unit configured to inspect a first image printed by the first printing unit, the first control unit further includes a first inspection control unit configured to control operation of the first inspection unit, the first inspection control unit controls the operation of the first inspection unit to inspect first images for all the pages for which the inspection is not completed when the conveyance of the printing medium is resumed after interruption of printing operation of the first printing unit and the second printing unit, the second printing device further includes a second inspection unit configured to inspect a second image printed by the second printing unit, the second control unit further includes a second inspection control unit configured to control operation of the second inspection unit, and the second inspection control unit controls the operation of the second inspection unit to inspect second images for all the pages for which the inspection is not completed when the conveyance of the printing medium is resumed after interruption of printing operation of the first printing unit and the second printing unit.

6. The printing system according to claim 3, wherein the first printing device further includes a first reading unit configured to read the first position mark, the first reading unit being disposed on an upstream side in a conveyance direction with respect to the first printing unit and on a downstream side in the conveyance direction with respect to a position of the first position mark after the printing medium is rewound, when the conveyance of the printing medium is resumed after interruption of printing operation of the first printing unit and the second printing unit, the first reading unit reads the first position mark printed on the first printing resumption page and notifies the first printing control unit that the first printing resumption page has passed, the second printing device further includes a second reading unit configured to read the second position mark, the second reading unit being disposed on an upstream side in the conveyance direction with respect to the second printing unit and on a downstream side in the conveyance direction with respect to a position of the second position mark after the printing medium is rewound, and when the conveyance of the printing medium is resumed after interruption of printing operation of the first printing unit and the second printing unit, the second reading unit reads the second position mark printed on the second printing resumption page and notifies the second printing control unit that the second printing resumption page has passed.

* * * * *